UNITED STATES PATENT OFFICE.

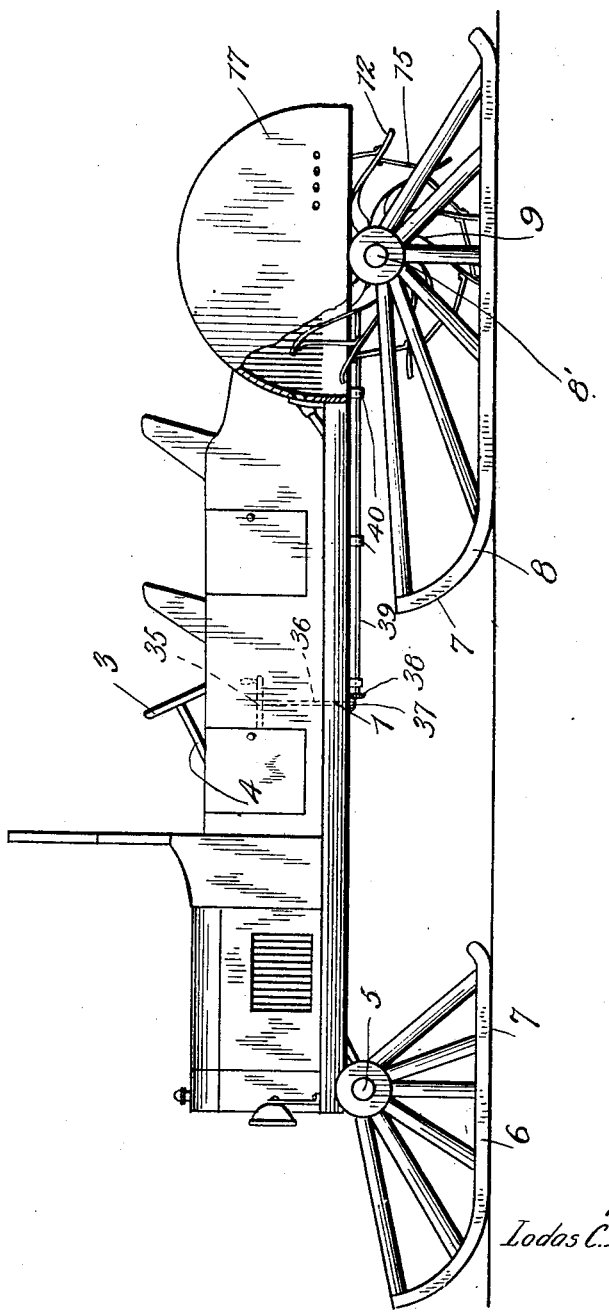

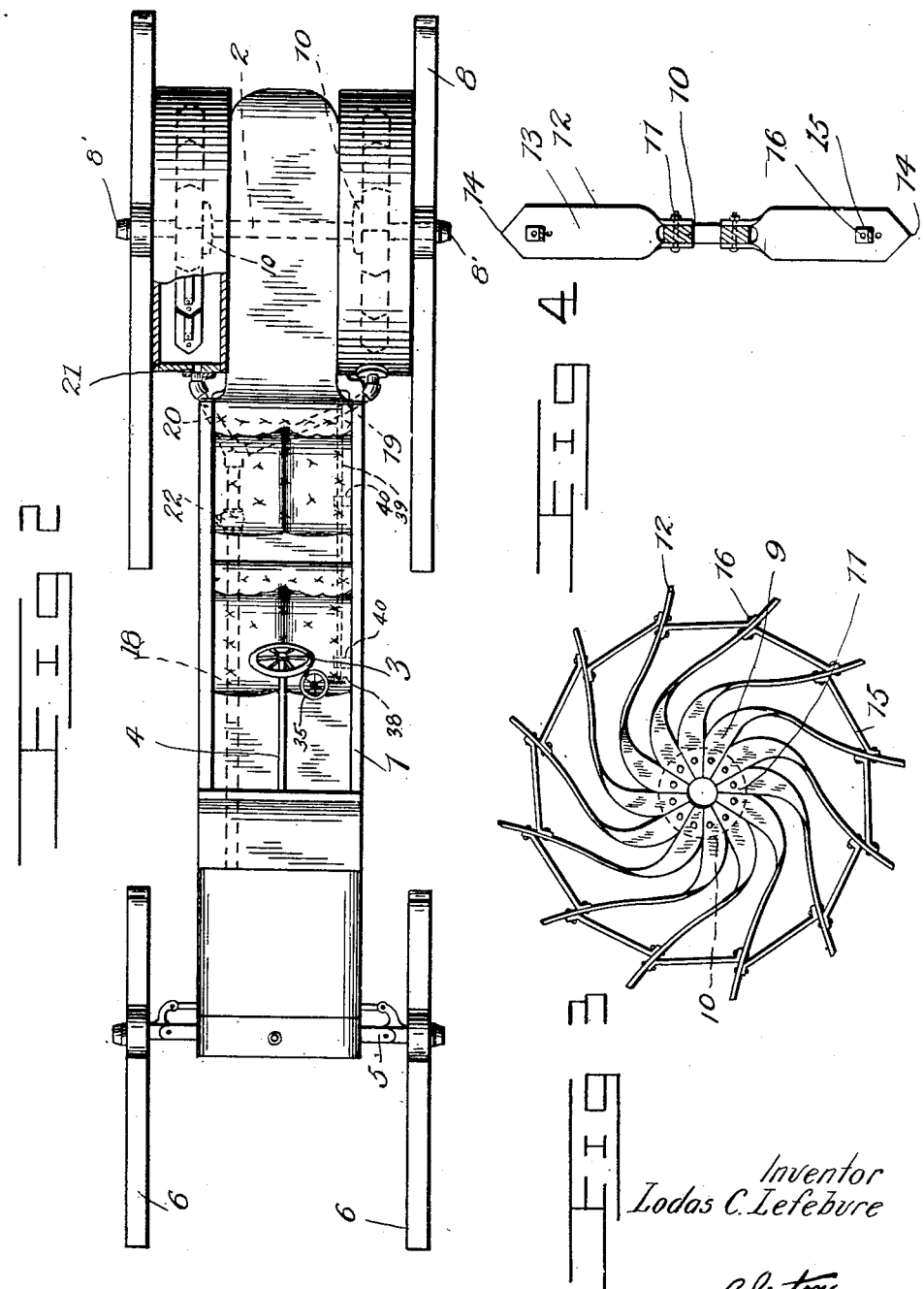

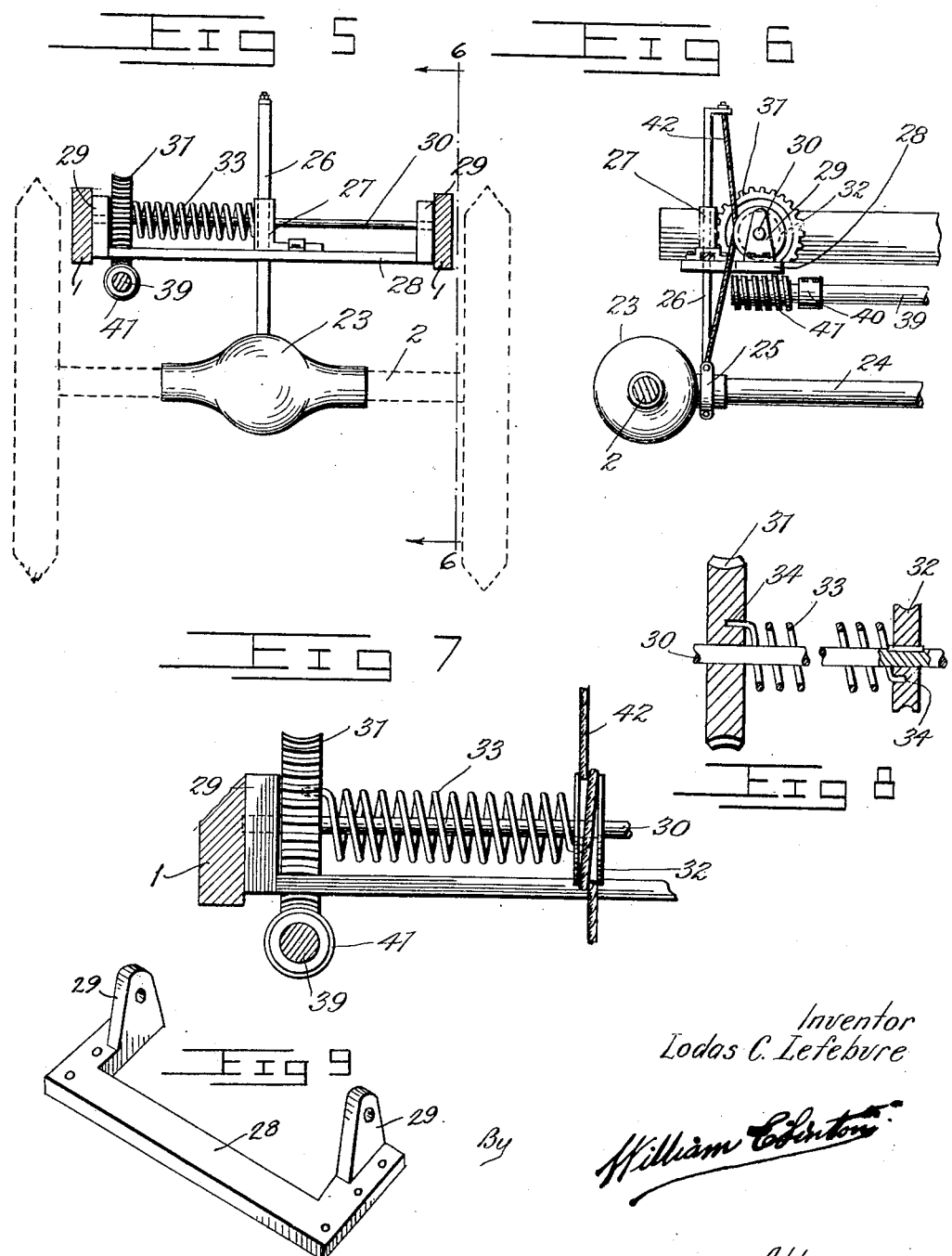

LODAS C. LEFEBVRE, OF GRENVILLE, QUEBEC, CANADA.

AUTOMOBILE SLEIGH.

1,371,035.  Specification of Letters Patent.  Patented Mar. 8, 1921.

Application filed May 29, 1919. Serial No. 300,631.

*To all whom it may concern:*

Be it known that I, LODAS C. LEFEBVRE, a subject of the King of Great Britain, residing at Grenville, Province of Quebec, Canada, have invented certain new and useful Improvements in Automobile Sleighs; and I do hereby declare that the following is a full, clear, and exact description of the invention, such as will enable others skilled in the art to which it appertains to make and use the same.

The invention relates to an automobile sleigh or attachment for wheeled vehicles and consists of an ordinary automobile body or a special body provided with a front guiding sled and a rear stationary sled, in lieu of the ordinary wheels, a power motor being carried by the body, having suitable controlling means. A propelling means is mounted on the rear axle and means is provided for operating the vehicle in snow of various depths.

An object of the invention is the provision of means for utilizing the exhaust from the engine to blow the loose snow from the propelling wheels.

Another object is to provide a novel manner of securing the propelling means upon the rear axle in pivotal relation thereto and having operative connections with the motor in the form of traction wheels which are driven and controlled.

A further object of the invention is to provide housings or guards for the propelling wheels, whereby the loose snow is deflected to the rear of the vehicle.

A still further object is to construct the propelling wheels so that the same are capable of perfect traction in snow of different depths.

A further object of the invention is to provide means for elevating and lowering the propelling wheels.

With the above and other objects in view which will hereinafter appear as the description continues, the invention consists of the novel features of construction, combination and formation of parts as will be hereinafter more fully described and particularly pointed out in the appended claim.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claim without departing from the spirit of the invention or sacrificing the efficiency of the same.

Referring to the drawings:—

Figure 1 is a side elevational view of my improved snowmobile with a portion broken away;

Fig. 2 is a plan view with a similar portion broken away;

Fig. 3 is a detail elevational view of one of the propelling wheels;

Fig. 4 is a detail view of the friction blades illustrating the connecting means to the axle hub;

Fig. 5 is a detailed sectional view of a portion of the wheel elevating mechanism;

Fig. 6 is a view at right angles to same take on the line 6—6 of Fig. 5;

Fig. 7 is an enlarged elevational view of Fig. 5;

Fig. 8 is a cross sectional view of the spring and gears.

Fig. 9 is a perspective view of the cross bar.

In the accompanying drawings like characters denote like parts in the several views and in the said drawings the numeral 1, designates the body of the vehicle to which my invention has been applied and may be of any suitable construction gasoline or other motor being carried thereby and having the usual drive shaft and connections with the rear or propelling axle 2.

The peculiar form of motor and the controlling means for same from the driver's seat may be of any well known construction and forms no important feature of the present invention, so further disclosure thereof is not made.

Positioned adjacent the driver's seat is the usual steering wheel 3, having post or standard 4 properly connected to the steering rods.

The front or steering sled is rigidly connected to the end portions of the front axle 5, and comprises the runners 6, which are of the usual design, as clearly shown in Fig. 1 of the drawings and said runners have their longitudinal edges 7, bent upwardly, so that they may slide over the snow or icy surface. The steering sled has suitable connection with the steering post, so that the same may be adjusted to guide the vehicle. The rear sled comprises runners 8, of the same general construction as the front runners 6 and are mounted on the axle spindles 8'.

The frame upon which the sleds are mounted comprises the vehicle body and an axle 2 is connected to said frame and has operative connection with the motor in the usual manner and carries thereon, the propelling or traction wheels 9. These traction wheels 9 are secured to the driven shaft hubs 10 by means of bolts and are disposed at the opposite sides of the vehicle adjacent the rear sled runners 7. The traction wheels 9, comprise a plurality of contact blades 12, which are so arranged on the hubs 10 that each blade is shock absorbing agent for entire wheel.

These blades as before stated, are secured to the hubs 10 and have edge to edge contact in their assembly thereon and at a point approximately central of their length are bent to present their flat surfaces 13 at right angles to the point of connection to the said hub as illustrated in Fig. 4. The outer ends of the blades are cut at angles to the medial point thereof, to form the points 14 and adjacent the outer ends are connected together by the brace bars 15. Each brace bar 15 is fastened at its opposite ends to the blades 12 by bolts 16 and is so positioned with respect to said blades, that one end is secured closer to the point 14 of each blade, than the other end which is secured to the next blade, so that a snow gripping medium is provided and in this connection, the brace bars 15 are in contact with the surface, when the snow is deep.

The housings or shields 17 of semi-circular configuration are secured to the rear of the platform 1 and cover the upper part of the traction wheels 9, so that the snow particles are deflected downwardly toward the road bed or surface.

A pipe 18 leading from the engine has connected therewith the two branch pipes 19 and 20 which latter communicate with openings 21 in the forward part of the housings 17, and carry the hot exhaust gases to the latter and such gases are directed against the contact blades 12, thereby dissolving the snow and ice particles accumulated thereon, so that the wheel is kept free from ice packing. A valve 22 may be adjusted to regulate the exhaust pressure.

It is obvious that by the construction set forth I provide wheels having the greatest tractive force and the same are at all times kept free of the accumulated snow, thereby obviating the tendency of the snow to pack on the blades and to prevent the perfect tractive function of the said wheels.

These contacting traction wheels by the peculiar construction and arrangement of their blades, and their supporting bars 15 exert a surface gripping function and each blade acts as a shock absorber and will penetrate into snow of various depths.

For elevating the traction wheels 9 and consequently the drive shaft 2 to compensate for the relative depths of snow encountered, I provide the mechanism for the accomplishment of that purpose as follows: A differential gear casing 23, inclosing the differential gears, is carried by drive shaft 2, and the usual transmission shaft 24 leads thereto, and secured to the said transmission shaft 24 by means of a collar 25, is a vertical rod 26, which is slidably mounted in a bracket 27, which is in turn bolted to the cross bar 28. This cross bar 28 has flanges 29 extending upwardly therefrom at right angles and is secured to the frame 1 of the vehicle, and the flanges are apertured for a transverse shaft 30. This shaft 30 carries the large gear 31 at one end and a pulley 32 spaced therefrom. A spring 33 encircles shaft 30 and has its end portions 34 secured to the gear 31 and pulley 32 respectively.

To elevate the traction wheels 9, a hand wheel 35, within the car body is actuated and such wheel is mounted on the upper end of a vertical shaft 36 carrying a bevel gear 37 at its lower end, which is in engagement with a similar bevel gear 38 on the horizontal shaft 39. This shaft is mounted in the bearing members 40, secured to the under surface of the car frame and carries at the other end a worm gear 41, which has meshing engagement with the large gear 31 on shaft 30.

A cable 42 is passed around pulley 32 and has one end secured to the top portion of the vertical rod 26 and its other end connected to the collar 25 on the transmission shaft 24.

Thus it will be seen, that motion imparted to the horizontal shaft 39 will be imparted to the large gear 31 and the pulley 32 will actuate the cable 42 and thus elevate the transmission shaft 24. The function of the spring 33, is to provide a cushioning means for the elevating mechanism and as the gear 31 is so much larger than the worm gear 41 and the pulley 32, the same will revolve at a slower rate of speed and consequently the spring 33 will be gradually coiled up, so that the elevating operation is not abruptly accomplished.

The sleigh may be constructed of any light material and any number of seats attached thereto.

Having thus fully described my invention, what I claim as new and desire to secure by Letters Patent is:—

An automobile sled comprising a frame, a motor mounted therein, wheels for driving said sled, a differential mechanism interposed between the wheels and motor, means for adjustably supporting the differential mechanism and wheels, whereby the latter can be moved vertically, a counter shaft, a gear keyed thereto, operating means positioned adjacent the driver's seat of the sled and operatively engaging said gear, a pulley partially rotatable on the shaft, a spring connecting the pulley and gear for limiting the movement of the pulley on said shaft and causing it to turn therewith, and a cable connected at its ends to the end of the supporting means and wound around the pulley as and for the purpose set forth.

In witness whereof I have hereunto set my hand.

LODAS C. LEFEBVRE.